United States Patent [19]

Arnold et al.

[11] Patent Number: 5,141,196
[45] Date of Patent: Aug. 25, 1992

[54] KEYBOARD SUPPORT

[75] Inventors: Gregory B. Arnold, Norwalk; Charles W. Klein, Stratford, both of Conn.; Bruce E. Taylor, Tipp City, Ohio

[73] Assignee: Monarch Marking Systems, Inc., Dayton, Ohio

[21] Appl. No.: 658,734

[22] Filed: Feb. 21, 1991

[51] Int. Cl.⁵ ............................................. F16M 11/00
[52] U.S. Cl. ................................... 248/397; 248/456; 248/205.2; 248/126
[58] Field of Search ............ 248/397, 456, 465, 205.2, 248/676, 126, 918, 439, 166, 447, 441.1, 454, 911, 912; 400/682

[56] References Cited

U.S. PATENT DOCUMENTS

| | | | |
|---|---|---|---|
| 3,043,047 | 7/1962 | LaFleur | 248/454 |
| 4,624,433 | 11/1986 | Henneberg | 248/456 X |
| 4,712,693 | 12/1987 | Striplin | 248/205.2 X |
| 4,776,553 | 10/1988 | Kobayashi | 248/912 X |
| 4,815,683 | 3/1989 | Ferrante | 248/205.2 |
| 4,902,079 | 2/1990 | Kaplan et al. | 248/126 X |
| 4,934,522 | 6/1990 | Nelson | 248/205.2 X |

FOREIGN PATENT DOCUMENTS 1359013 3/1964 France ................................ 248/447

*Primary Examiner*—Karen J. Chotkowski
*Attorney, Agent, or Firm*—Joseph J. Grass

[57] ABSTRACT

There is disclosed a support for a keyboard. The support can be mounted either on a generally horizontal surface such as on a table, a portable cart, or an upper surface of a printer or on a vertical surface such as a wall. The support is adjustable so that the keyboard can be positioned at different inclinations.

10 Claims, 2 Drawing Sheets

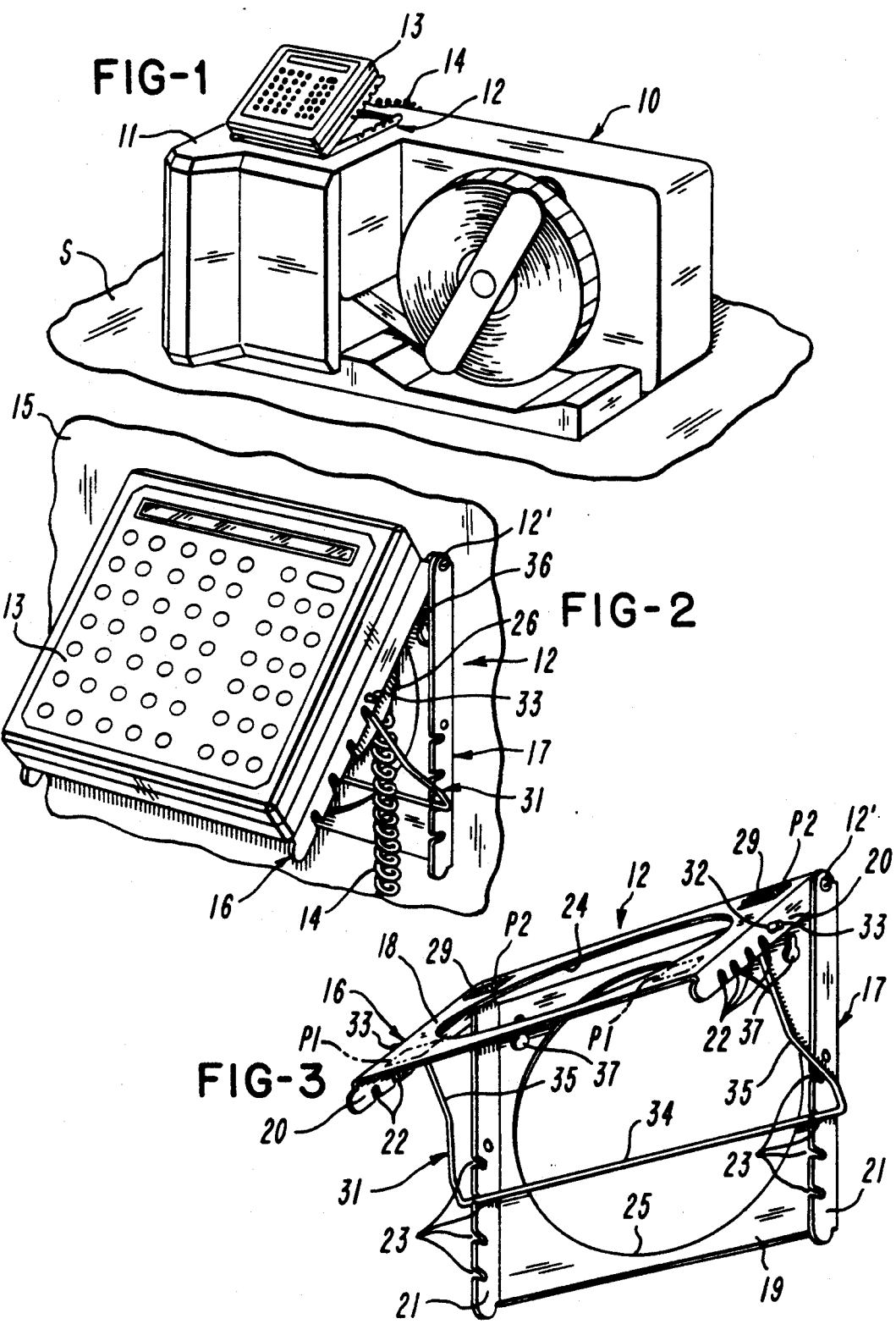

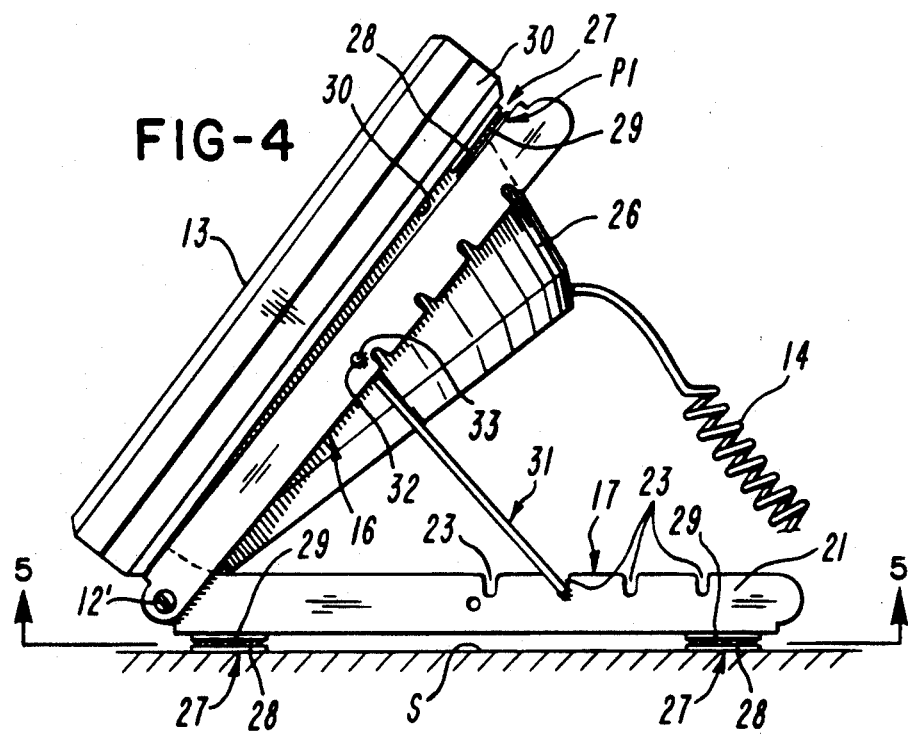
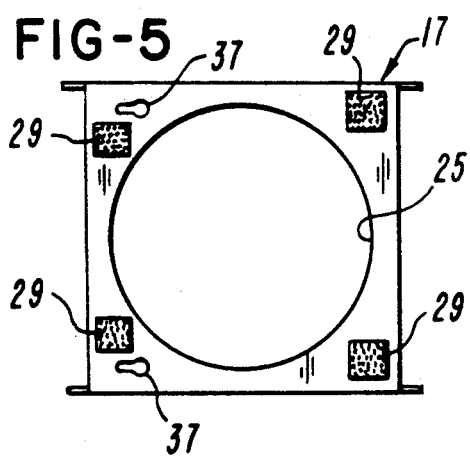
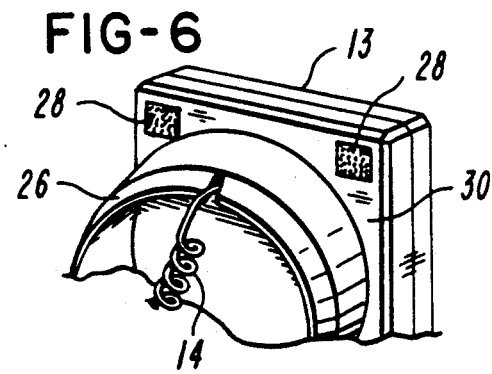
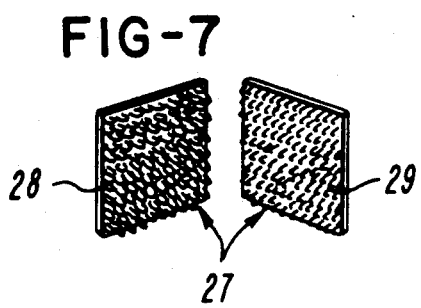
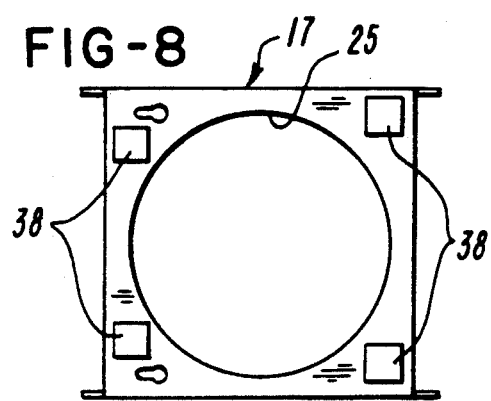

5,141,196

KEYBOARD SUPPORT

BACKGROUND OF THE INVENTION

1. Field of the Invention

This invention relates to supports for keyboards.

2. Brief Description of the Prior Art

Co-owned U.S. Pat. No. 4,776,714 granted Oct. 11, 1988 to Sugiura et al discloses a keyboard rotatably and removably mounted on a printer.

SUMMARY OF THE INVENTION

The invention relates to an improved, versatile, convenient-to-use, low-cost support for a keyboard.

It is a feature of the invention to provide a keyboard support which can be mounted on any suitable surface from a horizontal surface to a vertical surface.

It is another feature of the invention to provide a keyboard support which is low cost and has few parts. The parts include a pair of plate-like support members and a member for maintaining the first and second support members at a suitable acute angle with respect to each other. It is preferred that the first and second support members be identical so that the number of unique parts is kept to a minimum.

It is a feature of the invention that the keyboard support can be mounted either on a horizontal surface or on a vertical surface such as a wall. When the keyboard support is mounted on a horizontal surface the keyboard is held in one orientation on the keyboard support, and when the keyboard support is mounted on a vertical surface the keyboard is held in a different orientation on the keyboard support.

It is another feature of the invention to provide an improved keyboard support specially adapted to hold a keyboard at one of a plurality of selectable inclinations.

BRIEF DESCRIPTION OF THE DRAWINGS

FIG. 1 is a perspective view of a printer, with a keyboard mounted on the keyboard support of the invention;

FIG. 2 is a perspective view showing the keyboard mounted on the keyboard support which in turn is mounted on a wall;

FIG. 3 is a perspective view of the keyboard support in an orientation similar to that shown in FIG. 2;

FIG. 4 is a side elevational view of the keyboard support holding the keyboard, with the support attached to a horizontal surface;

FIG. 5 is a bottom view taken generally along line 5—5 of FIG. 4;

FIG. 6 is a view showing a fragmentary portion of the underside of the keyboard;

FIG. 7 is a rotated perspective view showing two portions of one of the fasteners used in connection with the keyboard support; and FIG. 8 is a view similar to FIG. 5, but showing frictional support pads or feet on the underside of the one of the support members.

DETAILED DESCRIPTION OF THE PREFERRED EMBODIMENTS

Referring to FIG. 1, there is shown a printer, for example a thermal printer 10 sold by Monarch Marking Systems, Inc., Dayton, OH U.S.A. The printer 10 has a flat horizontal surface 11 on which a keyboard support 12 is supported. The keyboard support 12 mounts a keyboard 13. The keyboard 13 is shown in greater detail in U.S. Pat. No. 4,776,714 which is incorporated herein by reference. The keyboard 13 is connected to the remainder of the printer 10 by a data cord 14. The data cord 14 is long enough so that the keyboard support 12 can mount the keyboard 13 on the printer 10 as shown in FIG. 1 or on a horizontal surface S adjacent the printer 10 or on a vertical wall 15 adjacent the printer 10 as shown in FIG. 2, or at other inclinations between the horizontal and the vertical.

With reference to FIG. 3, the keyboard support 12 is shown to comprise a first support member 16 and a second support member 17. The pivotally connected first and second support members 16 and 17 are preferably identical as shown for ease of manufacture, inventory maintenance and assembly. Each support member 16 and 17 is of one-piece construction. The support members 16 and 17 can be constructed of sheet metal, however, other materials such as plastics can be used. A pair of aligned pivot screws 12' pivotally connect pairs of flanges 20 and 21 at end portions of the support members 16 and 17. The support members 16 and 17 are generally flat and plate-like and include respective plate portions 18 and 19. Parallel flanges 20 are formed by bending marginal side portions of the sheet metal which forms the plate portion 18, and parallel flanges 21 are formed by bending marginal side portions of the sheet metal which forms the plate portion 19. The flanges 20 have spaced notches 22. The notches 22 on the flanges 20 are laterally aligned. Likewise, the flanges 21 have spaced notches 23. The notches 23 in the flanges 21 are laterally aligned. The plate portions 18 and 19 have respective openings or holes 24 and 25. The opening 24 is sized to receive base portion 26 of the keyboard 13. As shown in FIGS. 1, 2 and 4, the keyboard 13 is received and held gravitationally by the keyboard support 12. The keyboard 13 would be free to rotate relative to the keyboard support 13, however, it is preferred to provide fasteners 27 to prevent the keyboard 13 from rotating. The fasteners 27 are of the hook and loop type which are sold under the trademark DUAL-LOCK sold by Minnesota Mining and Manufacturing Company. An example of the fastener 27 is shown in FIG. 7 and it includes a loop portion 28 and a hook portion 29. FIG. 6 shows loop portions 28 adhesively secured to the underside of keyboard portion 30 of the keyboard 13. In the position shown in FIG. 4, hook portions 29 are adhesively secured to the plate portion 18 at positions P1 on the first support member 16. The positions P1 are shown in phantom lines in FIG. 3. The loop portions 28 releaseably attach to the hook portions 29 to hold the keyboard 13 against rotatation relative to the support member 16 during use when the keyboard support 12 and the keyboard 13 are mounted on a horizontal surface as shown in FIG. 4.

Alternatively, if the keyboard is to be wall mounted, then instead of positioning the hook portions 29 at positions P1, the hook portions 29 are secured adhesively to the plate portion 18 at the positions P2.

The support member 16 is maintained at a preselected acute angle by a bail or bail member generally indicated at 31. The flanges 20 have laterally aligned holes 32 for pivotally receiving end portions 33 of the bail member 31. The bail member 31 can be constructed of wire. The bail member 31 has a lateral portion 34 and a pair of arm portions 35. The arm portions 35 are connected to the lateral portion 34 and to respective end portions 33. It is apparent that the bail member 31 can be pivoted for cooperation with sets of notches 23 in the flanges 21 at any one of four selected positions. Although four sets of notches 23 are shown, a greater or lesser number can be provided. The notches 23 can accommodate the bail member 31 and hold the support member 16 in position irrespective of the position of the supporting surface. For example, the supporting surface can be horizontal as shown in FIGS. 1 and 4 or vertical as shown in FIGS. 2 and 3, or at other angles therebetween. The notches 23 are shaped so as to retain the bail member 31 in the selected position until the user decides to adjust the support member 16 to a different position, whereupon the support member 16 is pivoted slightly and the bail member 31 is lifted out of the set of notches 23 and repositioned in another set of notches 23.

Fasteners 27 are shown in FIG. 4 to attach the second support member 17 securely and releasably to the surface S. The loop portions 28 of the fasteners 27 can be adhered adhesively to the surface S and the hook portions 29 of the fasteners 27 can be adhered adhesively to the underside of the second support member 17. The portions 28 and 29 can be engaged to releasably attach the support member to the surface S.

In the position illustrated in FIGS. 2 and 3, screws 36 (only one of which is shown) extending through keyhole-shaped slots 37 in the second support member 17 can attach the keyboard support 12 to the wall 15.

Alternatively, as shown in the embodiment of FIG. 8, the second support member 17 can be provided with frictional pads 38 which can prevent the support member 17 from shifting on the surface 11 or S on which it rests.

Other embodiments and modifications of this invention will suggest themselves to those skilled in the art, and all such of these as come within the spirit of this invention are included within its scope as best defined by the appended claims.

We claim:

1. In combination: a keyboard for a printer, the keyboard having a keyboard portion and a base portion, a support including a first support member for mounting the keyboard, a second support member pivotally connected to the first support member for mounting the first support member either on a horizontal surface with the keyboard in a first orientation or on a vertical surface with the keyboard in a second orientation, the fist support member having an opening for removably receiving the base portion of the keyboard therein, and means or changing the angle of the first and second support members relative to each other to enable the keyboard to be positioned at an inclination convenient to the user.

2. The combination as defined in claim 1, wherein the second support member has means for providing spaced notches, and wherein the first support member has a pivotally mounted bail cooperable with a selected done of the notches to hold the first and second support members at a selected angle relative to each other.

3. The combination as define din claim 2, wherein the opening is generally circular and the base portion of the keyboard is generally annular.

4. In combination: a keyboard for a primer, the keyboard having a keyboard portion and a base portion, a support including a first support member for mounting the keyboard, a second support member pivotally connected to the first support member for mounting the first support member either on a horizontal surface with the keyboard in a first orientation or on a vertical surface with the keyboard in a second orientation, the first support member having an opening for removably receiving the base portion of the keyboard therein, means for changing the angle of the first sand second support members relative to each other to enable the keyboard to be positioned at an inclination convenient to the user, and wherein the opening is generally circular and the base portion of the keyboard is generally annular.

5. In combination: a keyboard for a printer, the keyboard having a keyboard portion and a base portion, a support including a first support member for mounting the keyboard, a second support member pivotally connected to the first support member for mounting the first support member either on a horizontal surface with the keyboard in a first orientation or on a vertical surface with the keyboard in a second orientation, the first support member having an opening for removably receiving the base portion of the keyboard therein, means for changing the angle of the first and second support members relative to each other to enable they keyboard to be positioned at an inclination convenient to the user, and wherein the base portion makes a rotatable fit in the opening to enable the angular position of the keyboard to be changed relative to the first support member.

6. In combination: a keyboard for a printer, the keyboard having a keyboard portion and a base portion, a support including a first support member for mounting the keyboard, a second support member pivotally connected to the first support member for mounting the first support member either on a horizontal surface with the keyboard in a first orientation or on a vertical surface with the keyboard in a second orientation, the first support member having an opening for removably receiving the base portion of the keyboard therein, means for changing the angle of the first and second support members relative to each other to enable the keyboard to be positioned at an inclination convenient to the user, and wherein the first and second support members are substantially identical in construction.

7. The combination as defined in claim 6, wherein the second support member has means for providing spaced notches, and wherein the first support member has a pivotally mounted bail cooperable with a selected one of the notches to hold the first and second support members at a selected angle relative to each other.

8. The combination as defined in claim 6, wherein the second support member is positionable on a horizontal surface, and wherein the second support member includes means for positioning the second support member on a vertical surface.

9. The combination as defined in claim 6, wherein the base portion makes a rotatable fit in the opening to enable the angular position o the keyboard to be changed relative to the first support member.

10. The combination defined in claim 6, wherein the opening is generally circular and the base portion of the keyboard is generally angular.

* * * * *

UNITED STATES PATENT AND TRADEMARK OFFICE
CERTIFICATE OF CORRECTION

PATENT NO. :  5,141,196

DATED      :  August 25, 1992

INVENTOR(S) :  Gregory B. Arnold et al

It is certified that error appears in the above-identified patent and that said Letters Patent is hereby corrected as shown below:

Column 3, line 46, "fist" should be --first--; line 49, "or" should be --for--; line 56, "done" should be --one--; line 59, "define din" should be --defined in--; line 62, "primer" should be --printer--.  Column 4, line 9, "sand" should be --and--; line 25, "they" should be --the--; line 58, "o" should be --of--.

Signed and Sealed this

Eighth Day of March, 1994

Attest:

BRUCE LEHMAN

Attesting Officer

Commissioner of Patents and Trademarks